United States Patent
Wedin et al.

(10) Patent No.: US 6,798,850 B1
(45) Date of Patent: Sep. 28, 2004

(54) METHOD AND ARRANGEMENT IN A RADIO RECEIVER SYSTEM WITH SEVERAL STANDARDS

(75) Inventors: Anders Wedin, Uppsala (SE); Richard Hellberg, Huddinge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/512,377

(22) Filed: Feb. 25, 2000

(30) Foreign Application Priority Data

Feb. 26, 1999 (SE) .............................................. 9900719

(51) Int. Cl.⁷ .............................................. H04L 27/06
(52) U.S. Cl. ........................ 375/340; 375/316; 375/347
(58) Field of Search ................................ 375/140, 141, 375/142, 144, 148, 150, 267, 279, 316, 324, 340, 347; 370/342, 347, 536

(56) References Cited

U.S. PATENT DOCUMENTS

| | | | |
|---|---|---|---|
| 5,513,209 A | 4/1996 | Holm ........................... | 375/354 |
| 5,592,480 A | * 1/1997 | Carney et al. ............... | 370/347 |
| 5,598,439 A | 1/1997 | Wagner ...................... | 375/326 |
| 5,612,975 A | 3/1997 | Becker et al. .............. | 375/379 |
| 5,640,416 A | 6/1997 | Chalmers .................... | 375/147 |
| 5,790,529 A | * 8/1998 | Haber ......................... | 370/536 |
| 5,809,058 A | * 9/1998 | Sato ........................... | 375/148 |
| 5,960,040 A | * 9/1999 | Cai et al. .................... | 375/279 |

FOREIGN PATENT DOCUMENTS

| | | |
|---|---|---|
| EP | 0 680 033 A3 | 9/1997 |
| EP | 0 847 169 A2 | 6/1998 |
| JP | 10-145345 | 5/1998 |
| WO | WO 96/28946 | 9/1996 |

OTHER PUBLICATIONS

European Search Report dated Jul. 10, 1999.

\* cited by examiner

*Primary Examiner*—Chieh M. Fan

(57) ABSTRACT

A system, method, and receiver for receiving radio signals modulated according to different radio communication standards. Radio signals are received and downconverted to an intermediate frequency (IF) signal. An A/D-converter samples the IF signal at a sampling rate and digitizes the sampled signal into a digital signal. A channelizer filters out at least two modulated channels from the digital signal. A first ago channel is modulated according to a Time Division Multiple Access (TDMA) standard, and a second channel is modulated according to a Code Division Multiple Access (CDMA) standard. A first demodulating unit demodulates the TDMA channel, and a second demodulating unit demodulates the CDMA channel. Each of the demodulating units detects and, when needed, resamples each of the modulated channels individually, and delivers a corresponding demodulated channel. A Frequency Division Multiple Access (FDMA) channel may also be received and processed.

7 Claims, 7 Drawing Sheets

METHOD AND ARRANGEMENT IN A RADIO RECEIVER SYSTEM WITH SEVERAL STANDARDS

This application claims priority under 35 U.S.C. §§119 and/or 365 to 9900719-7 filed in Sweden on Feb. 26, 1999; the entire content of which is hereby incorporated by reference.

TECHNICAL FIELD

The present invention relates to a method and arrangements in a radio receiver system with several standards. More specifically, the invention relates to a method and arrangements of receiving signals in a radio receiver system at the same time with several signal format standards, such as different CDMA, TDMA and FDMA standards. Furthermore, the invention relates to a rake receiver for use in such systems.

DESCRIPTION OF RELATED ART

Different channel access methods exist for the sending and receiving of digital signals. In TDMA, Time Division Multiple Access, a channel consists of a time slot in a periodic train of time intervals over the same frequency. In FDMA, Frequency Division Multiple Access, a communication channel is a single radio frequency band. Interference with adjacent channels is limited by the use of band pass filters which only pass signal energy within the specified frequency band. In contrast, Code Division Multiple Access, CDMA, allows signals to overlap in both time and frequency. Thus, several CDMA signals can share the same frequency band, but the CDMA receiver can also operate at several frequency bands.

In CDMA-technique, simultaneous connections can thus make use of a common frequency band. The selection, i.e. discrimination, between the desired signal and other signals is carried out by suitable signal processing, which is based on that the desired signal is coded. All simultaneous connections have different codes.

In the CDMA system, a radio frequency signal is received by an antenna unit and is downconverted to an intermediate frequency in one or several stages in the analog part of the radio. The intermediate signal is sampled and digitized by an A/D converter and filtered in a channelizer to filter out each channel sufficiently well so that signals of other frequencies do not interfere. The result is a bandlimited signal that can be fed to base band processing to reproduce the sent digital data stream by a demodulating unit, which uses for example band spreading technique.

In band spreading, radio signals are transmitted by expanding the bandwidth of the information signal by means of an independent code signal. The most common type of band spreading is direct sequence, in other words direct modulation of the carrier wave with a code or signature sequence, also called pseudo-noise sequence or PN-sequence. The signature sequence usually comprises N bits which are called chips. The entire N-chip sequence is referred to as a transmitted symbol.

In traditional CDMA with direct spreading, the band spreading is achieved so that each fed information bit is replaced by a code sequence that consists of N chips and a spread spectrum is formed.

A plurality of coded information signals modulate a radio freqency carrier and are jointly received as a composite signal at a receiver. If the receiver is authorized and has a synchronous code signal, then the composite signal is correlated with one of the unique codes, and the corresponding information signal can be isolated and demodulated by the actual decoding technique.

There are specifications for the connection between two units with respect to the mechanical connection, the electrical and logic properties of the signals and the rules for the signal sequences. The logic or physical border between two functions is called interface.

In a mobile radio system, the existence of such signal reflecting surfaces as walls, building structures, hills, mountains, etc. are liable to cause the receiver of a radio signal perceiving the signals to be dispersed in time, wherewith signals that carry the same information will arrive at the receiver at different time delays.

To optimally detect the transmitted symbols the rays received must be combined, whereby the signal becomes diversity amplified. Diversity gain can be achieved in advanced signal processing, for example with a rake receiver, wherein several signal components can be used.

A rake-receiver is a radio receiver which utilizes this feature of time dispersed signals. The rake-receiver includes a plurality of independent receiver units, so called rake taps or fingers, each of which receives and tracks, or locates, a respective ray. The rake-receiver also includes means for combining the received signals, and means for delaying these signals so that they will be brought into phase prior to combining the signals. The rake-receiver can usually combine components with separation more than one or equal to one chip-period. The rake fingers or rake taps of a rake receiver in a CDMA-system is adjusted in accordance with the arrival time of the signal.

An ideal sampling is carried out at the strongest place of the signal. If a sample is taken only once during one chip duration, and it is not taken wherein the signal is strongest, then the sampling is not taken optimally in every chip or symbol with non-optimal detection as a result and a systematic error is achieved.

The probability for correct sampling is increased by oversampling, in which several samples are taken for each chip period and the best sample, a decision sample, for each chip can be chosen, which has a start time that indicates the phase of the signal.

The oversampling ratio is defined as the ratio of the signal's sample rate to the symbol or chip rate. In bandlimiting it means that, the more bandlimited the signal is, the more samples there exist for each chip and thus the oversampling ratio is increased with decreasing bandwidth.

The systematic error connected to the sampling of each chip gets smaller with increased oversampling ratio, but, on the other hand, the oversampling ratio out from the channelizer should be as low as possible so that the receiver system would not need complicated hardware. The lower the oversampling ratio, the farther from the optimum placement one gets, with decreasing sensitivity as a consequence. This sensititvity reduction is called "detector loss". Thus, the systematic error also depends on the data rate and the equipment performance of the system.

The sampler (i.e., the A/D converters), has a predetermined sample period, which is adjusted in relation to the symbol or chip rate of the radio receiver in a simple way. The adjusted rate is usually a small integer multiple of the symbol rate, f-symbol, or in case of a direct sequence CDMA system, a small integer multiple of the chip rate, f-chip.

With a resampler it is possible to resample from a sample rate that is not an integer times the chip rate to a proper sample rate.

Resampling is usually performed by interpolation between points in the original data sequence, using different techniques. Some of the techniques use extensive computation, but the more bandlimited the signal is (consisting of only relatively low frequencies) the simpler are the satisfactory techniques.

The simplest interpolation techniques are different "hold" circuits, where first order hold uses the first derivative of the signal to interpolate between points and zero order hold just approximates the desired sample with the closest sample in the original data stream. Zero order hold is of course simpler, but requires a more strongly bandlimited signal in order not to give too high approximation errors. Other resampling techniques often involve higher order filtering or polynomial interpolation.

Resamplers are previously described in for instance U.S. Pat. No. 5,598,439 and U.S. Pat. No. 5,513,209 for demodulation of digitally modulated signals in communication systems. CDMA and rake receivers are decribed in for instance U.S. Pat. No. 5,640,416 and JP-08256084. A previous solution for a multi-rate CDMA communication is presented in EP-814581.

A base station that supports different radio transmission standards is known from EP-815698. The system of this patent can support CDMA and TDMA signals at the same time by using at least two digital channel devices. The channelizer of this patent can only work with one bandwidth and an own channelizer is needed for each standard. A system with several standards having this solution needs quite extensive hardware and the diversity gain is missed.

Using a digital channelizer that can simultaneously support a wide variety of channel bandwidths can minimize the costs for the radio receiver system equipment. Channelizers of this kind are described in the Swedish patent application 9802059-7 of the inventor.

In a conventional one-standard receiver system, the sample rate is chosen in accordance with the chip rate in an integer relation. With several CDMA and other standards with mutually different symbol or chip rates in the system it is not possible to choose the sampling rate so that it is an integer or other simple relation to all chip and symbol rates because of different chip rates in the systems. Therefore a resampler is necessary.

Table 1 shows the various bandwidths and symbol or chip rates for different cellular systems. If several standards would be used simultaneously in the same base station, it is apparent that new technique would be needed to simultaneously handle these different standards in a proper way and without extensive hardware.

TABLE 1

| Standards | Bandwidth (kHz) | Symbol/Chip Rate |
|---|---|---|
| PDC | 25 | 21 ksymbols/sec |
| IS-136 | 30 | 24.3 ksymbols/sec |
| GSM | 200 | 270.833 ksymbols/sec |
| IS-95 | 1250 | 1.228 Mchips/sec |
| WCDMA | 5000 | 4.096 Mchips/sec |

PDC = Pacific Digital Cellular (Japan)
IS-136 = ETSI standard
GSM = Global System for Mobile Communications
IS-95 = ETSI standard
WCDMA = Wideband CDMA

DESCRIPTION OF THE INVENTION

An object of the invention is to make such future mobile communication systems and base stations possible, wherein several standards coexist. In such systems, for example, GSM might coexist with wide band CDMA in Europe and in USA D-amps might coexist with both narrow band and wide band IS-95 as well as with GSM.

More in detail, the object of the invention is to make a radio receiver system for such a mobile communication system of the above kind, wherein there is to reduce costs, used common hardware for the handling of the different standards running in the same base station.

Another object of the invention is a base station with several standards, CDMA standards in particular, that have a higher equipment performance than earlier multistandard radio receiver systems.

The method of the invention is mainly characterized in that the demodulating units detects and, when needed, resamples each of the modulated channels individually and delivers corresponding demodulated channels.

The multistandard radio receiver system of the invention is mainly characterized in that the modulated channels are demodulated and, when needed, resampled individually for each standard with a unique signal format.

In the invention, resampling is carried out for the different CDMA and other signal format standards in the base station, to get the proper sample rate for each chip or symbol rate of each standard.

The A/D sampling frequency of the system is chosen in accordance with one of the chip or symbol rates of the different standards in the system. In the invention, resampling is carried out for the other standards.

In the first embodiment of the invention, a proper sample rate for each standard that is in accordance with the chip or symbol rate is achieved in the multi-standards radio receiver system with a separate resampler for each standard. Each standard that needs to have the sample rate resampled in accordance with its chip rate or symbol rate has an own resampler.

Some of the demodulating units in the multi-standards radio receiver might comprise means for resampling and detecting at least one TDMA signal, such units having a TDMA-resampling unit and a TDMA-demodulator/equalizing unit, while other such demodulating unit might comprises means for resampling and detecting at least one CDMA signal, such other units having a CDMA-resampling unit, and a CDMA-demodulator/rake receiver unit. The radio receiver might also comprise other kind of demodulator units and resamplers for those.

The resampler might be before the interface co-located with the channelizer, or alternatively, it can be placed after the interface, co-located with the rake receiver. In the latter case, the data rate over the interface is the same as the out rate of the channelizer, which means that it is lower than in the first case, because the resampler has a high out rate. Concequently, this is a more economic alternative. Between the resampler and the rake receiver, the data rate is high.

One of the systems with a resampler in accordance with the invention, works so that the oversampling rate out from the resampler is much higher than the inrate and thus increases correct sampling.

In addition to the systematic error that might exist in connection with the sampling, the resampling operation gives a certain error, too.

This means that in the two versions of the first embodiment of the invention, there are two error sources in the system, the resampling error and the systematic error, due to the displacement in time, of each rake tap from the optimum position. The total error is the sum of the systematic error and the resampling error.

In the second and preferred embodiment of the invention the resampling and detecting of the modulated channels are carried out in a joint operation in at least one of the demodulating units in the multi-standards radio receiver system. In this embodiment at least one demodulating unit is a CDMA receiver which comprises means for resampling and detecting at least one CDMA signal and has a rake receiver with individual resamplers in each rake finger. An implementation of this type of a rake tap differs from the implementation of a normal rake tap in that it performs joint control of both resampling and demodulation.

The resampling rake taps can use different resampling techniques, which were described earlier in the application. If the simplest zero order hold technique is used, the rake taps keeps track of the timing of the incoming samples and, according to the timing of the chips or symbols in the signature sequence, selects the sample from the incoming signal that is closest to that chip or symbol in time. In interpolation techniques, the desired sample can for instance be interpolated between two incoming samples. In polyphase filtering, the actual phase of the filter is determined by the distance to the closest sample. Different polyphase components are used, which give a given delay to match the incoming time.

In the second embodiment of the invention a low oversampling rate can be used as the rake receiver can receive different sample rates. There is only one error source in the second embodiment of the invention since the average displacement of the rake tap from the optimum position can be kept extremely low. The distance between two signal samples to be correlated in a rake tap will vary, but on an average the number of samples per unit will correspond to the chip rate of the receiver system. Differently stated, the correlation between the code sequence and incoming data stream will in each rake tap be performed on mutually different, non uniformly sampled, sets of data. When sample selection is performed individually on each rake tap, the demodulation, preferably by synchronization with a PN sequence, will be optimal for all rake taps. The only error source will then be the resampling error.

Resampling with a zero order hold in a CDMA system gives at a certain oversampling ratio a certain error. This error is of the same magnitude as the mean displacement error coupled to the sampling of each chip in a rake tap. Other types of resampling will give other error magnitudes.

In accordance with a further embodiment of the invention, the method is extended to higher order hold or other resampling techniques. More extensive computations, such as polynomial interpolation or polyphase filtering, are needed to calculate interpolated sample values according to the resampling technique used. This can be done by resampling or interpolation filter or polynomial interpolator that is synchronized with the PN sequence.

The computational complexity of this resampling or interpolation filter or polynomial interpolator can be much lower in the preferred embodiment of the invention than for a common resampler before the rake taps, since the received signal output need not be oversampled. This compensates for the cost of having individual resampling for each rake tap, at least for systems with only a few channels.

The total computational complexity is probably lower for a system with zero order hold resampling in each rake tap, which therefore is used in the preferred embodiment of the invention.

Since the resampling is done individually in each rake tap, the type of resampling can be individually chosen for each rake tap and also individually optimized. This can be done in conjunction with the estimation of the channel impulse response, so that the best resampling is chosen for the best "ray" in the multipath channel response, or optimized in some other way that gives a better performance than having all resampling rake taps implemented equal.

The advantages of the inventions are that several standards can be used in the same radio receiver system with less hardware than in previous systems since only one channelizer is needed. A channelizer is often computationally more complex than a resampler. The second embodiment of the invention gives the highest performance and is therefore the preferred embodiment. In this embodiment a more correct sampling is achieved since it is possible to have separate resampling for each rake finger. Furthermore, the method is relatively simple to control and is therefore seen to be very useful.

SUMMARY OF THE INVENTION

Existing CDMA receiver systems usually operate with only one signal format standard. In future mobile telecommunications several standards will coexist. The object of the invention is to make such a multi-standards radio receiver system for a mobile communication system of the above kind, wherein there is to reduce costs, used common hardware for the handling of the different standards, CDMA standards in particular, running in the same base station, and which have a higher equipment performance than earlier multistandard receiver systems.

With more than one symbol or chip rate in the system, which is the case when there are simultaneous standards running in the same base station, the chip or symbol rates are not related in such a way to each other that it is possible with existing equipment to choose a sample rate that is an integer or other simple relation of the symbol or chip rate or other simple relation with common hardware for the different standards.

In the invention, resampling is therefore carried out for the different CDMA and other standards in the base station, to get the proper sample rate for each chip or symbol rate of each standard.

The demodulation units of the multi-standards radio receiver system of the invention resamples and detects each of the modulated channels individually and delivers corresponding demodulated channels. In one of the demodulating units, the sampling rate is in accordance with the sampling rate of the A/D converter and resampling is thus not needed.

In the preferred embodiment of the invention, resampling and detecting of the modulated channels are carried out in a joint operation in at least one such demodulating unit in the multi-standards radio receiver system. In this embodiment at least one demodulating unit is a CDMA receiver which comprises means for resampling and detecting at least one CDMA signal and has a rake receiver with individual resamplers in each rake finger.

The invention is also concerned with a rake receiver in accordance with the preferred embodiment of the invention. The rake receiver receives the samples in the time they have and in accordance with one of the resampling techniques, selects the sample from the incoming signal that is closest to that chip in time. As the demodulation and resampling is carried out in a joint operation in a way according to the invention, the error in connection with the displacement of time of the rake taps can be kept low.

In the further embodiments of the invention, the method is extended to individual resampling techniques in different rake taps and to preferred combinations of the oversampling ratio and the resampling technique.

In the following, the invention is explained by means of figures according to some of the embodiments of the invention. The following embodiments are not intended to restrict the invention and many of the details can vary in the scope of the inventive idea. The demodulation can for example be carried out in another way than with syncronization with a PN sequence and the different standards in the radio receiver system can be differently chosen.

DETAILED DESCRIPTION OF THE DRAWINGS

Figure 1:
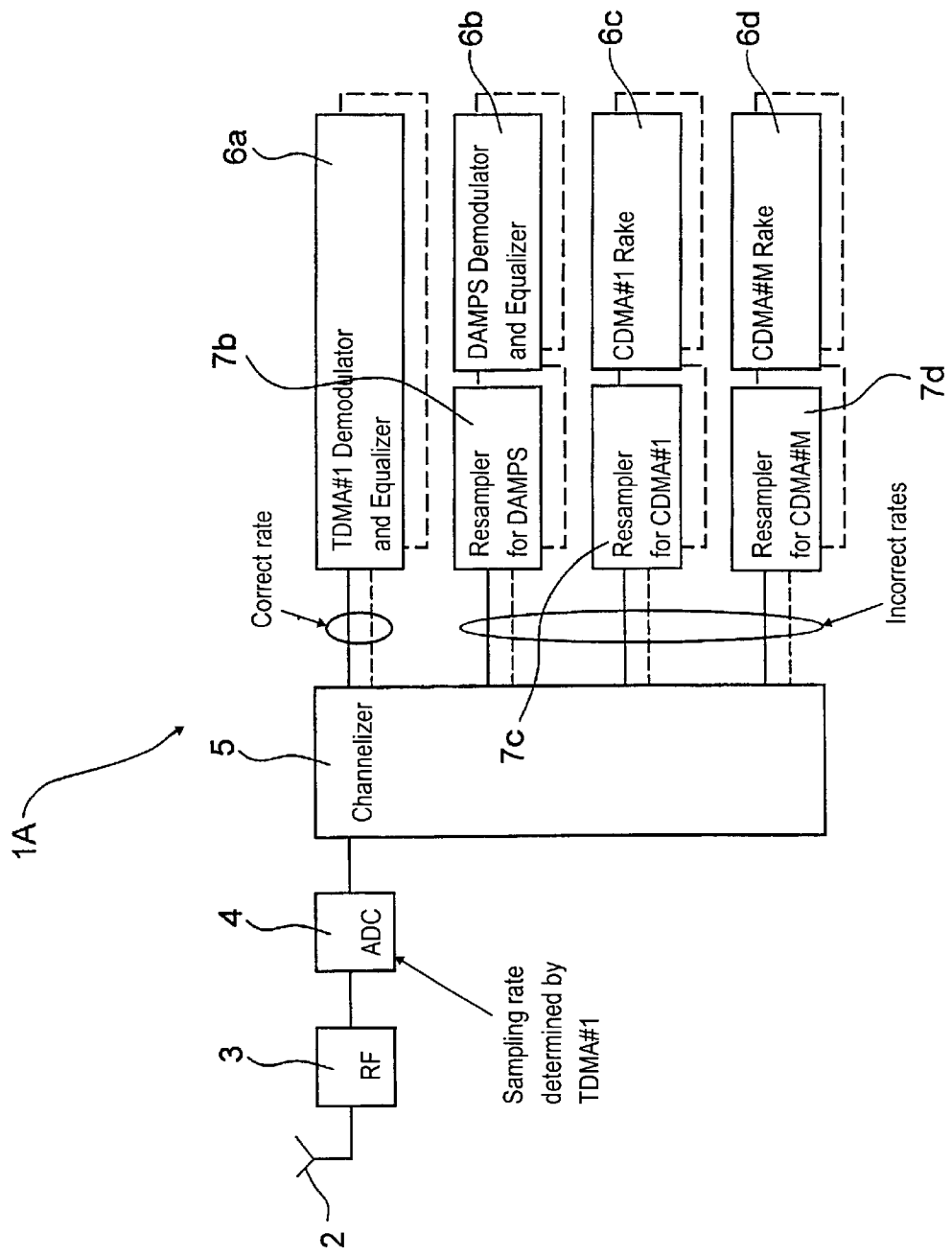
FIG. 1 is a schematic view over a multistandard radio receiver system with several TDMA and CDMA standards according to the first embodiment of the invention

FIG. 1 shows a multistandards radio receiver system 1A with several TDMA and CDMA standards according to the first embodiment of the invention. In FIG. 1, radio signals of different frequencies, RF signals, are received by an antenna 2. The RF signal is then downconverted to an intermediate frequency IF by a radio frequency unit 3. An A/D converter, which has the symbol 4 in FIG. 1, converts the analog IF signal to a digital one. Since the A/D converter only can be clocked for one speed at a time the data rate of the received signal has to be resampled to a rate suitable for base band processing. This rate is modified in accordance with the symbol or chip rate of one of the standards used in the multistandards system. In the embodiment of FIG. 1, it is converted to a sampling rate that is an integer times the symbol rate used in the standard of a TDMA demodulator/equalizer, which in the figure has been marked with symbol 6a The signal is sampled in the A/D converter with certain sample rate and digitized to a digital signal. The desired signals are then outfiltered in the channelizer 5 so that signals at other frequencies do not interfere. The channelizer output signal is a bandlimited signal that is fed for base band processing in one of the demodulation units 6a, 6b, 6c, 6d to reproduce the data information sent with the signal.

Signals can now directly be fed to receiver 6a, as the sample rate of the A/D converter 4 is in accordance with the symbol rate of receiver 6a, so that the sample rate is an integer times this symbol rate or otherwise simply related.

Signals sent to the other receivers operating with other chips and symbol rates, however, have to be resampled before they can be demodulated. In FIG. 1, every receiver, i.e. the DAMPS demodulator and equalizer 6b, the CDMA Rake receiver 6c and the CDMA Rake 6d, has its own resampler, i.e. resamplers 7b, 7c and 7d respectively. The resamplers 7b, 7c, 7d resample the output signal from the channelizer 5 to be in accordance with the respective chip or symbol rate of the receivers 6b, 6c and 6d so that the resample rate is preferably an integer times the actual chip or symbol rate. The rake taps of the RAKE receivers 6b, 6c and 6d then receive signals in time with the chip rate for demodulation/decoding and for combining the same to achieve diversity gain.

Figure 2:
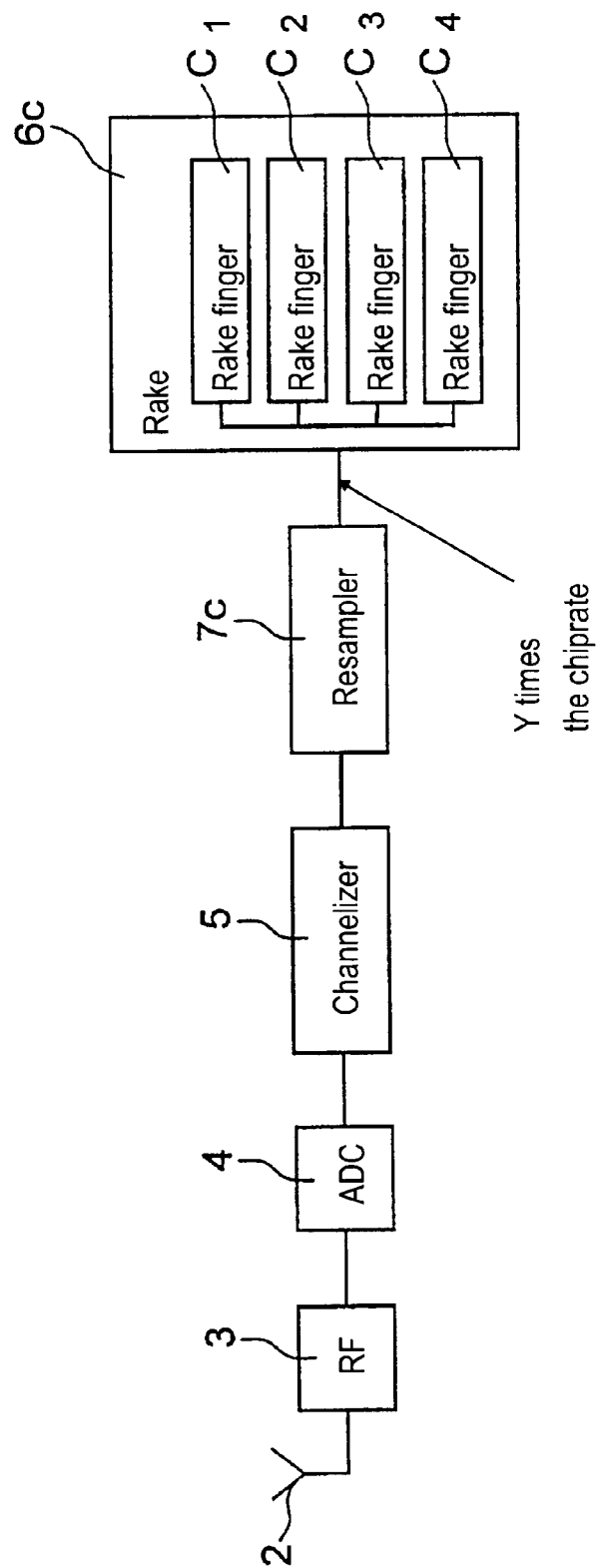
FIG. 2 is a schematic view over a part of FIG. 1 that is more detailed with respect to the RAKE receiver.

FIG. 2 shows a part of FIG. 1 that is more detailed with respect to the RAKE receiver 6c in the system. The functions of the antenna 2, the radio frequency unit 3, the A/D converter 4, the channelizer 5, the resampler 7c and the RAKE reciever 6c are explained in connection with FIG. 1. The RAKE receiver 6c has a number of RAKE taps or fingers c1, c2, c3 and c4. The RAKE receiver 6c requires a certain (integer) oversampling ratio (OSR) to be able to adjust the placement of the RAKE taps, or fingers c1, c2, c3 and c4, in time to where the maximal signal is. The signal has been filtered in the channelizer 5 so that it only contains frequencies up to slightly higher than f-chip/2 of the standard used in receiver 6c.

Figure 3:
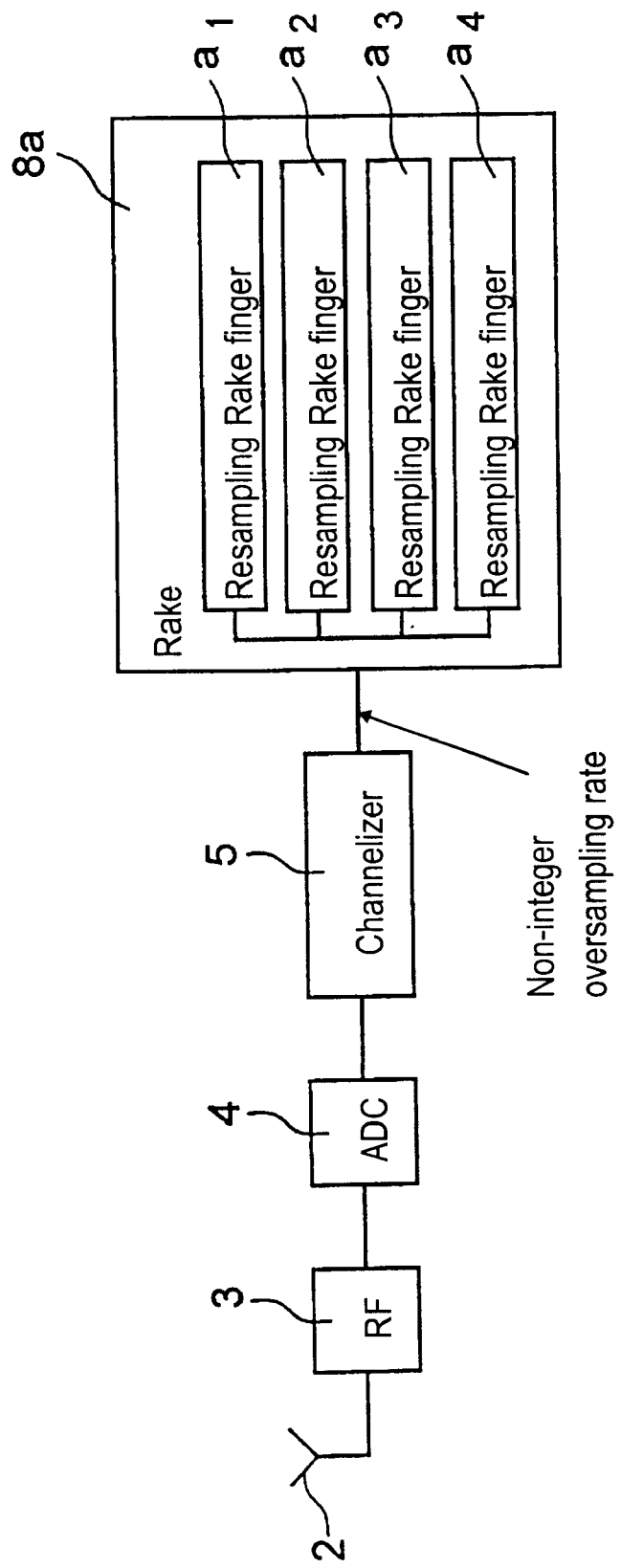
FIG. 3 is a schematic view over a part of FIG. 4 that is more detailed with respect to the RAKE receiver.

FIG. 3 is a part of a multistandard radio receiver system with several TDMA and CDMA standards according to the second and preferred embodiment of the invention. The functions of the antenna 2, the radio frequency unit 3, the A/D converter 4, the channelizer 5 are explained in connection with FIG. 1. In the RAKE receiver 8a of FIG. 3, resampling is performed individually in each rake tap a1, a2, a3 and a4, respectively so that resampling and demodulation by for instance correlation with the PN sequence are carried out in the same operation in each of the rake taps a1, a2, a3 and a4. A more detailed description of the joint operation of demodulation and resampling is presented in connection with the description of FIG. 5 and 6. The signals received by the rake taps a1, a2, a3 and a4 of the RAKE recivers 8a are combined to achieve diversity gain.

Figure 4:
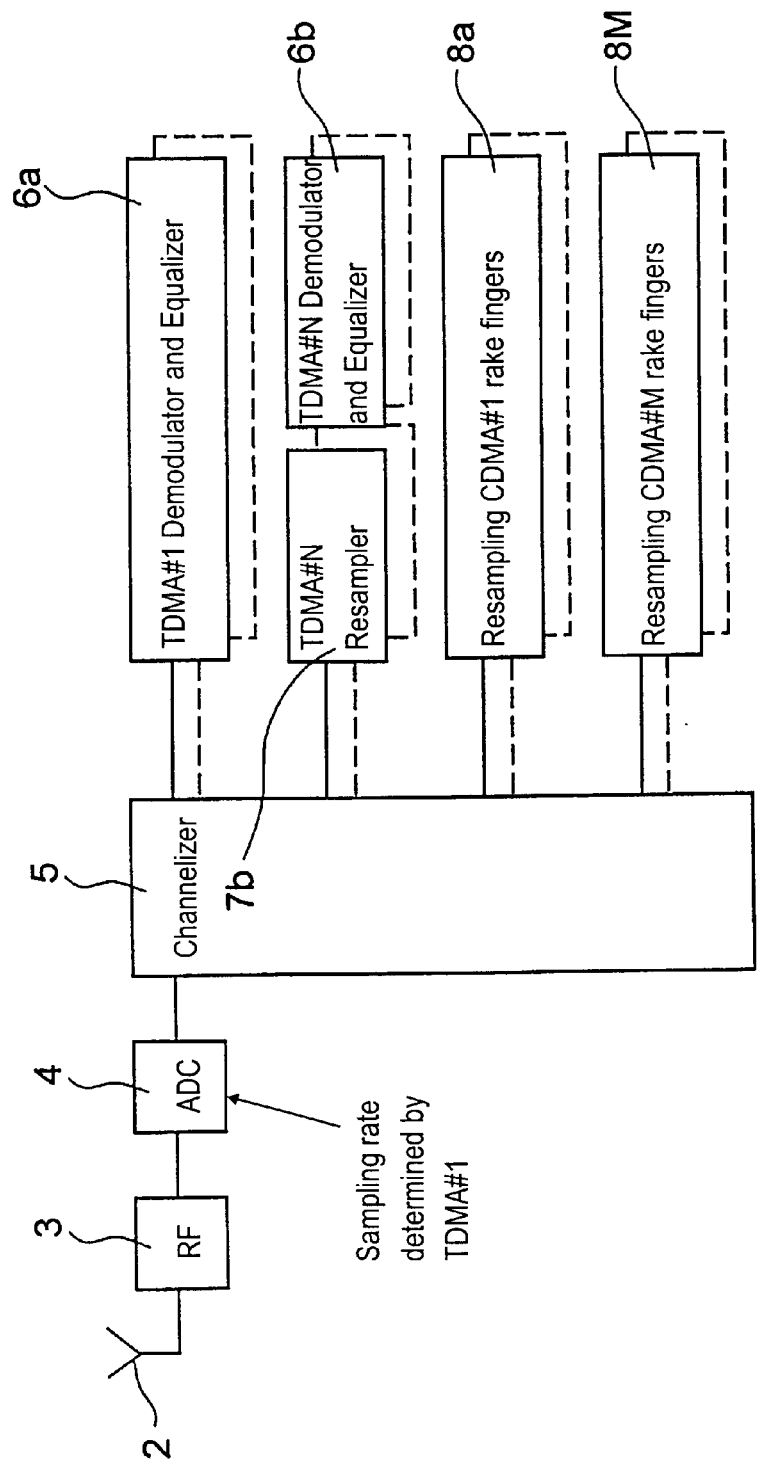
FIG. 4 is a schematic view over a multistandard radio receiver system with several TDMA and CDMA standards according to the second and preferred embodiment of the invention.

FIG. 4 represents a schematic view over a multistandard radio receiver system with several TDMA and CDMA standards according to the second and preferred embodiment of the invention. The functions of the antenna 2, the radio frequency unit 3, the A/D converter 4, the channelizer 5, and the receivers 6a and 6b are explained in connection with FIG. 3. The function of the CDMA reciever 8a has been explained in connection with FIG. 3. The CDMA recievers 8A–8M in FIG. 4 is a similar CDMA receiver as 8a with individual resampling rake taps.

Figure 5:
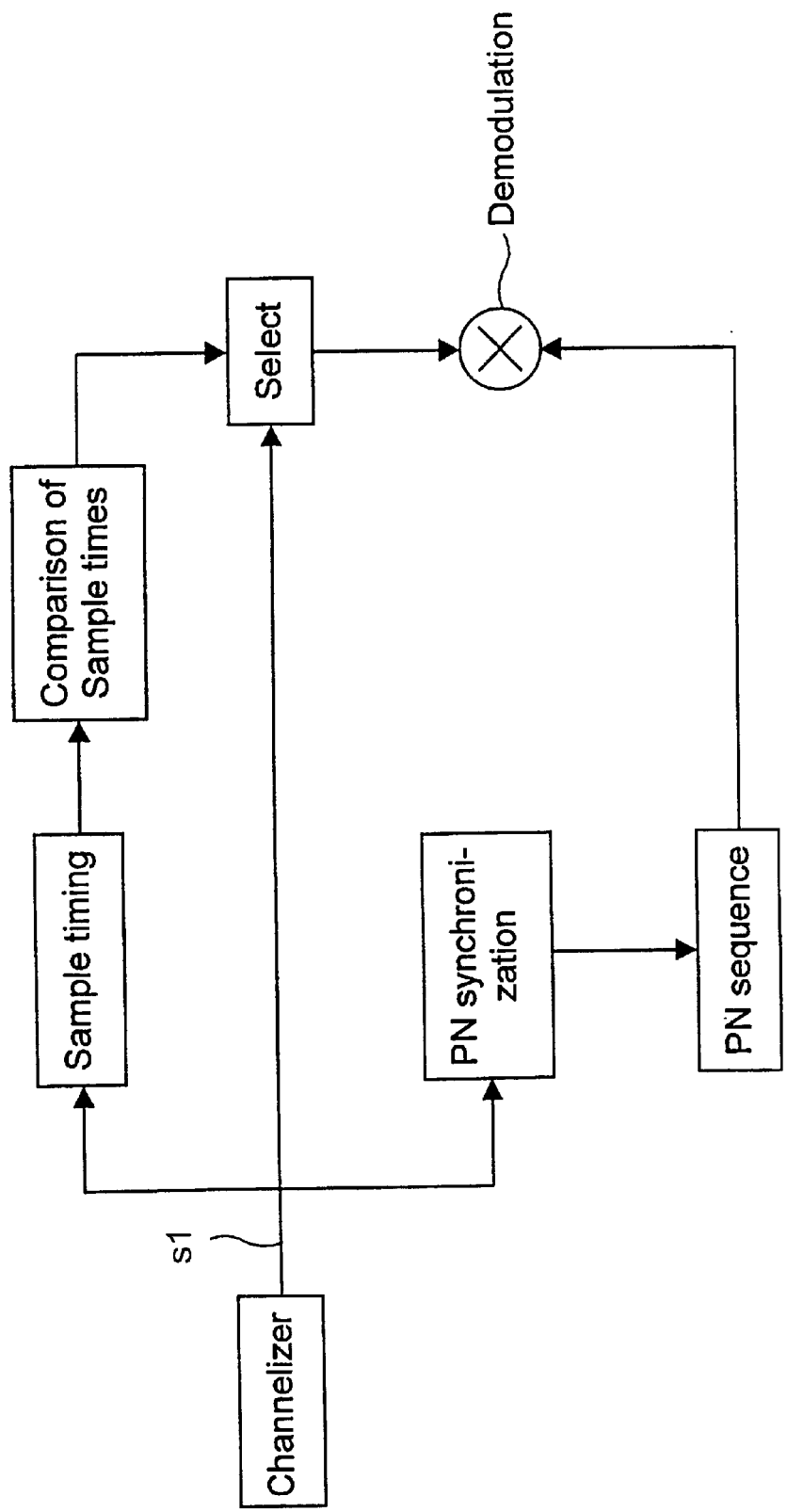
FIG. 5 is a functional view over a RAKE tap in a RAKE receiver according to the second and preferred embodiment of the invention.

FIG. 5 is a schematic view over the function of one of the RAKE taps in the RAKE receiver of FIG. 3 in accordance with the second and preferred embodiment of the invention. A signal s1 is coming from the channelizer with a non-integer oversampling rate. The rake taps performs joint control of decoding and sample selection by comparing the timing of the incoming samples, and, according to the timing of the chips, in the PN sequence, selects the sample from the incoming signals that is closest to that chip in time. As the resample selection is performed individually like this in each rake tap, the decoding will be optimal for all rake taps and the average displacement of the rake tap from the optimum position can be kept zero. The selected sample is then correlated with the PN sequence of the closest chip and the corresponding information signal is achieved.

Figure 6:
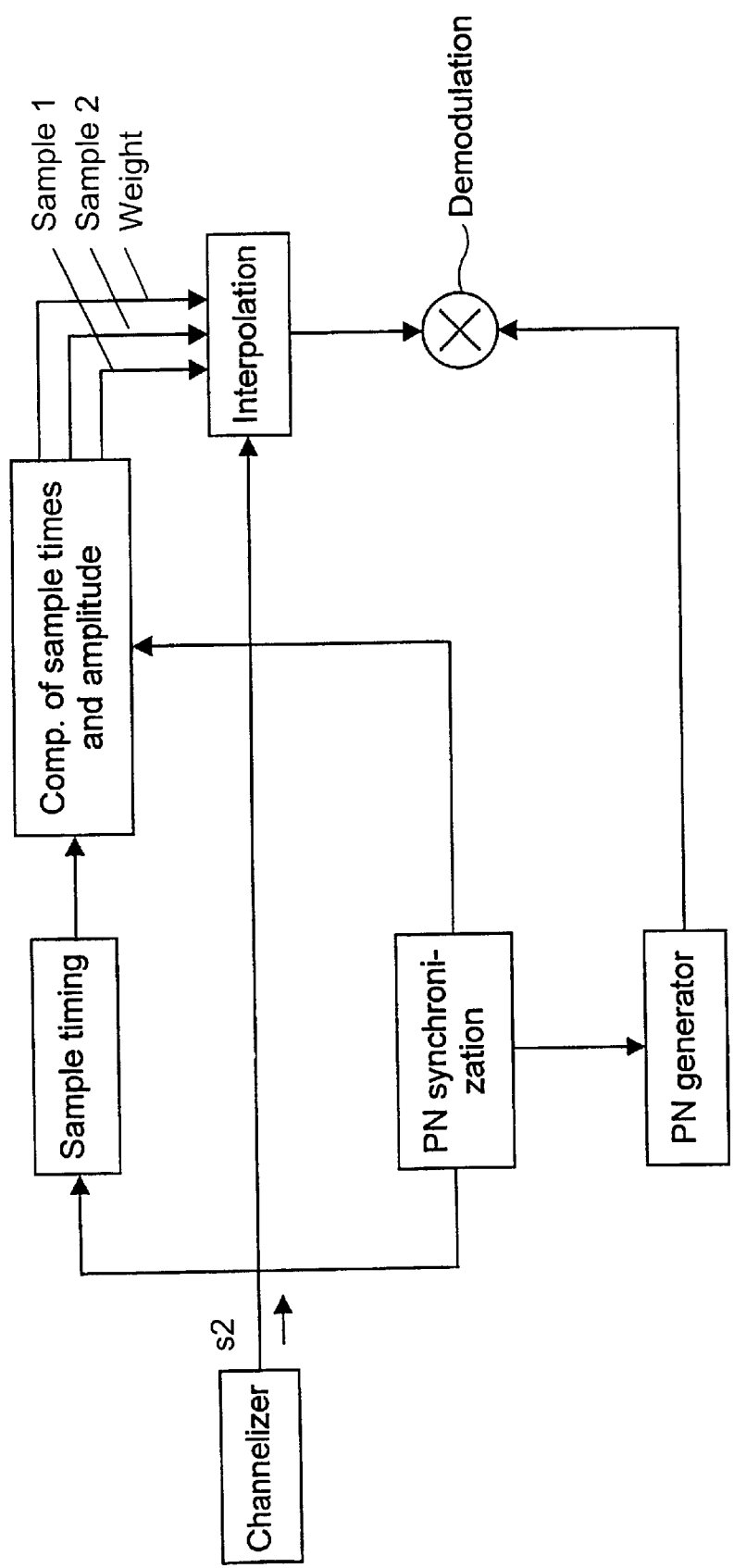
FIG. 6 is a functional view over a RAKE tap of a RAKE receiver according to a further embodiment of the invention.

FIG. 6 is a schematic view over one of the RAKE taps of the RAKE receiver 8a of FIG. 3 according to another version of the second embodiment of the invention. A signal s2 is coming from the channelizer with a non-integer oversampling rate. Instead of just selecting the closest sample more extensive computations to calculate interpolated sample values between two samples are carried out by a suitable interpolation resampling technique. This can be done by resampling or interpolation filter or by a polynomial interpolator that is synchronized with the PN sequence.

Figure 7:
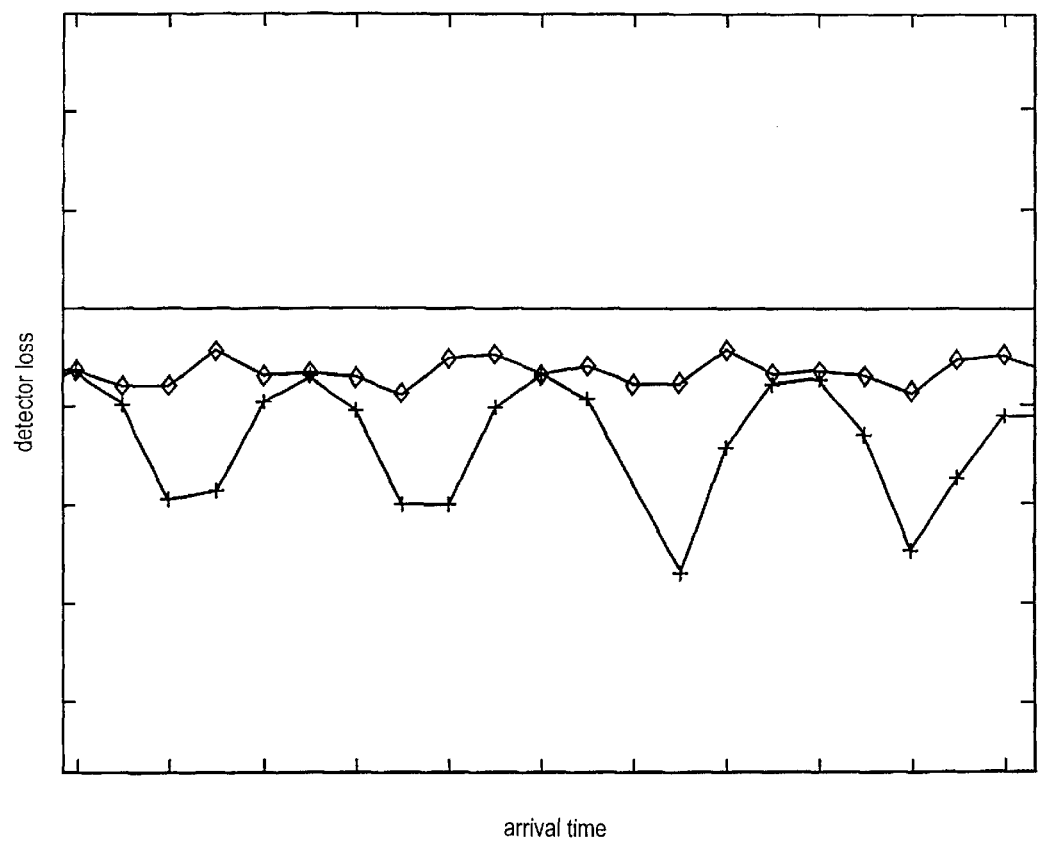
FIG. 7 is a result of a computer simulation result of two embodiments of the invention.

In FIG. 7, a computer simulation of two sucessful embodiments of the invention is presented. The straight line represents the ideal case with correct sampling with correct demodulation as a result, the detector loss being 0. The line which is marked with + shows the result obtained by using a separate resampler before the demodulation unit to obtain an integer sample rate related to the chip rate. The third line marked with rhombs represents the preferred embodiment of the invention, wherein the resampling is carried out with a rake receiver with individual resampling rake taps.

The error vs arrival time for the second embodiment is at an average only a half of the combined error for the first embodiment of the invention, wherein a separate, "common", resampler is used (the +-line), when the channelizer rate and resampler output are approximately equal.

The parameters used in the simulation are:

Channelizer rate: 31

Samples/chip: 11

Resampler output rate: 3 samples/chip

What is claimed is:

1. A multi-standards radio receiver system comprising:
    an antenna unit for receiving a radio frequency (RF) signal;
    a radio frequency unit for downconverting the received RF signal to an intermediate frequency (IF) signal;
    an A/D-converter for sampling the IF signal with a certain sampling rate and digitizing the sampled signal into a digital signal;
    a channelizer for filtering out at least two modulated channels from the digital signal, wherein a first channel is modulated according to a Time Division Multiple Access (TDMA) radio communication standard, and a second channel is modulated according to a Code Division Multiple Access (CDMA) radio communication standard, wherein the TDMA and CDMA communication standards have different chip or symbol rates, and the AND converter adjusts the sampling rate in accordance with the chip or symbol rate of a selected one of the TDMA or CDMA standards; and
    at least two demodulating units, wherein a first demodulating unit demodulates the TDMA channel, and a second demodulating unit demodulates the CDMA channel, each of the demodulating units detecting and delivering a corresponding demodulated channel without having to resample the selected TDMA or CDMA channel.

2. The multi-standards radio receiver system of claim 1, wherein the TDMA demodulating unit includes a TDMA-demodulator/equalizing unit.

3. The multi-standards radio receiver system of claim 1, wherein the second demodulating unit includes a CDMA-demodulator/rake receiver unit.

4. The multi-standards radio receiver system of claim 1, wherein the system includes a plurality of CDMA receivers, each of which operates with a different bandwidth and chip rate.

5. A method of receiving different signal format standards in a multi-standards radio receiver system, said method comprising the steps of:
    receiving radio frequency (RF) signals;
    downconverting the received RF signals to an intermediate frequency (IF) signal;
    sampling the IF signal with a certain sampling rate;
    digitizing the sampled signal into a digital signal;
    filtering out at least two modulated channels from the digital signal, a first channel being modulated according to a Time Division Multiple Access (TDMA) radio communication standard, and a second channel being modulated according to a Code Division Multiple Access (CDMA) radio communication standard, wherein the TDMA and CDMA communication standards have different chip or symbol rates;
    adjusting the sampling rate of the sampling step in accordance with the chip or symbol rate of a selected one of the TDMA or CDMA standards;
    demodulating the TDMA channel in a first demodulating unit; and
    demodulating the CDMA channel in a second demodulating unit;
    wherein each of the demodulating units detects and delivers a corresponding demodulated channel without having to resample the selected TDMA or CDMA channel.

6. The method of claim 5, wherein the second demodulating unit includes a CDMA-demodulator/rake receiver unit having a plurality of rake fingers.

7. The method of claim 6, wherein each rake finger correlates between a code sequence and incoming mutually different, non-uniformly sampled sets of data received in the RF signal.

* * * * *